United States Patent
Kamakura et al.

[11] Patent Number: 6,012,817
[45] Date of Patent: Jan. 11, 2000

[54] WATERDROP REMOVING APPARATUS FOR VEHICLE

[75] Inventors: Hiroshi Kamakura; Choji Sakuma; Hironori Yamaguchi; Kozo Shimamura, all of Wako, Japan

[73] Assignee: Honda Giken Kogyo Kabushiki Kaisha, Tokyo, Japan

[21] Appl. No.: 09/146,773

[22] Filed: Sep. 4, 1998

[30] Foreign Application Priority Data

Aug. 9, 1997 [JP] Japan .................................... 9-243008

[51] Int. Cl.⁷ .............................. G02B 7/00; G02B 7/182
[52] U.S. Cl. ........................ 359/509; 359/507; 359/872
[58] Field of Search .................................. 359/507, 509, 359/841, 871, 872, 876, 838; 15/313; 250.001, 250.003

[56] References Cited

U.S. PATENT DOCUMENTS

| | | | |
|---|---|---|---|
| 4,561,732 | 12/1985 | Japes | 359/509 |
| 4,903,581 | 2/1990 | Nilsson | 98/2.04 |
| 5,140,719 | 8/1992 | Cowan | 15/313 |

*Primary Examiner*—Cassandra Spyrou
*Assistant Examiner*—Jared Treas
*Attorney, Agent, or Firm*—Armstrong, Westerman, Hattori, McLeland & Naughton

[57] ABSTRACT

In a waterdrop removing apparatus for a vehicle, a blower is attached to a part of high rigidity within a door body to reduce vibration and noise. Air discharged from the blower is guided to a door mirror by a nozzle to blow away waterdrops wetting a surface of the door mirror. The blower is attached to an attachment bracket which is fixed to a door hinge together with a front end wall of the door body interposed between the door hinge and the attachment bracket.

1 Claim, 8 Drawing Sheets

WATERDROP REMOVING APPARATUS FOR VEHICLE

BACKGROUND OF THE INVENTION

The present invention relates to a waterdrop removing apparatus for removing waterdrops wetting a door mirror and a side window of a motorcar or at least the door mirror.

Generally, in such an apparatus, a blower is provided in a door body and air discharged from the blower is guided to a surface of the door mirror or the side window by a nozzle or a duct connected to a discharge port of the blower to blow away the waterdrops.

Hereinafter, in order to incorporate the blower into the door body, a supporting member for attaching the blower was provided on an inner surface of an inner panel or an outer panel and the blower was attached to the panel by the supporting member.

However, rigidity of the panel is so low that the blower cannot be supported firmly and large vibration and noise occur when the blower operates. If it is intended to enhance rigidity of the panel, an additional reinforcement must be provided for example, so that the number of parts is increased and work for incorporating the blower into the door body becomes troublesome.

SUMMARY OF THE INVENTION

The present invention has been accomplished in view of the foregoing and an object of the invention is to provide a waterdrop removing apparatus for a vehicle in which a blower is attached to a portion of high rigidity within a door body by few parts and vibration and noise can be reduced.

In order to attain the above object, the present invention provides a waterdrop removing apparatus for a vehicle having a nozzle for guiding air discharged from a blower disposed in a door body at least to a door mirror to blow away waterdrops wetting a surface of the door mirror, wherein an attachment bracket for attaching the blower in the door body is fixed to a door hinge or a neighborhood of the door hinge.

Since the attachment bracket for attaching the blower in the door body is fixed to a door hinge or a neighborhood of the door hinge which has a high rigidity, the blower can be fixed firmly without an additional reinforcement and the vibration and noise due to the blower can be reduced.

In the above-mentioned waterdrop removing apparatus, the door hinge and the attachment bracket may be clamped by a bolt together with a front end wall of the door body interposed between the door hinge and the attachment bracket.

Since the attachment bracket is clamped to the door hinge having a high rigidity together with the front end wall of the door body interposed between the door hinge and the attachment bracket, the blower can be incorporated easily using few parts and fixed firmly to reduce vibration and noise.

DETAILED DESCRIPTION OF THE PREFERRED EMBODIMENT

Figure 1:
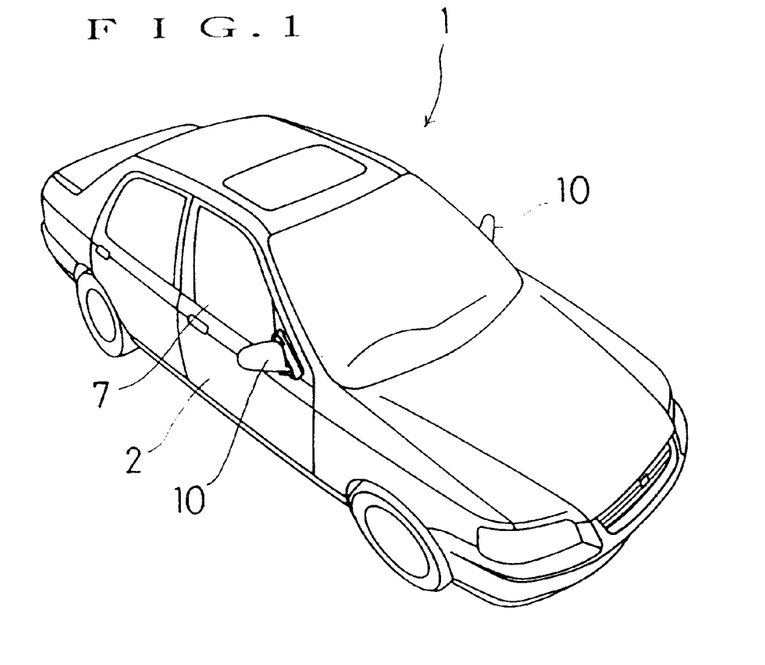
FIG. 1 is an outside view of a motorcar having a waterdrop removing apparatus according to a preferred embodiment of the present invention.

Hereinafter, a preferred embodiment of the present invention will be described with reference to FIGS. 1 to 11. FIG. 1 shows a motorcar 1 having a waterdrop removing apparatus according to the embodiment. The motorcar 1 is a 4-doors sedan having door mirrors 10 attached to the right and left front doors respectively.

Figure 2:
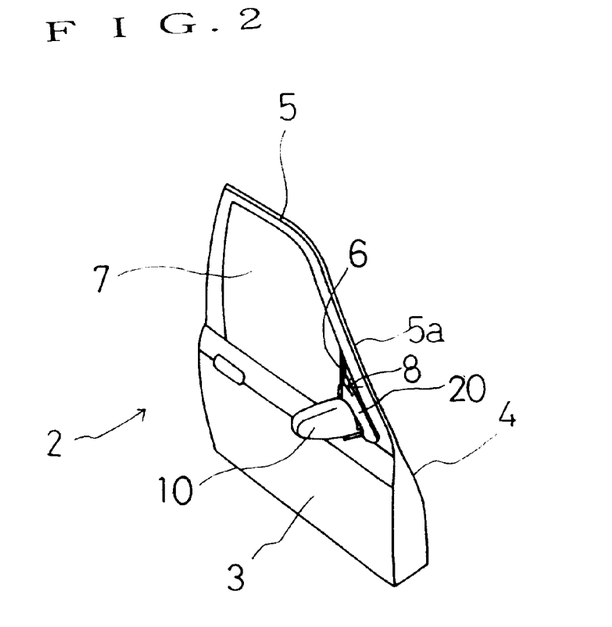
FIG. 2 is a perspective view of a right side front door.

As shown in FIG. 2, the front door 2 has a door body formed by an outer panel 3 and an inner panel 4 spaced each other. A sash 5 framing a circumference of a side window 7 and a guide sash 6 framing a front edge of the side window 7 and guiding ascent and descent thereof are provided above the door body.

The door mirror 10 is projected so as to rise and fall on a triangular corner 8 formed by an inclined front part 5a of the sash 5, the guide sash 6 and an upper edge of the outer panel 3. A nozzle 20 for waterdrop removing is provided inside of the door mirror 10, between the door mirror and the triangular corner 8.

Figure 3:
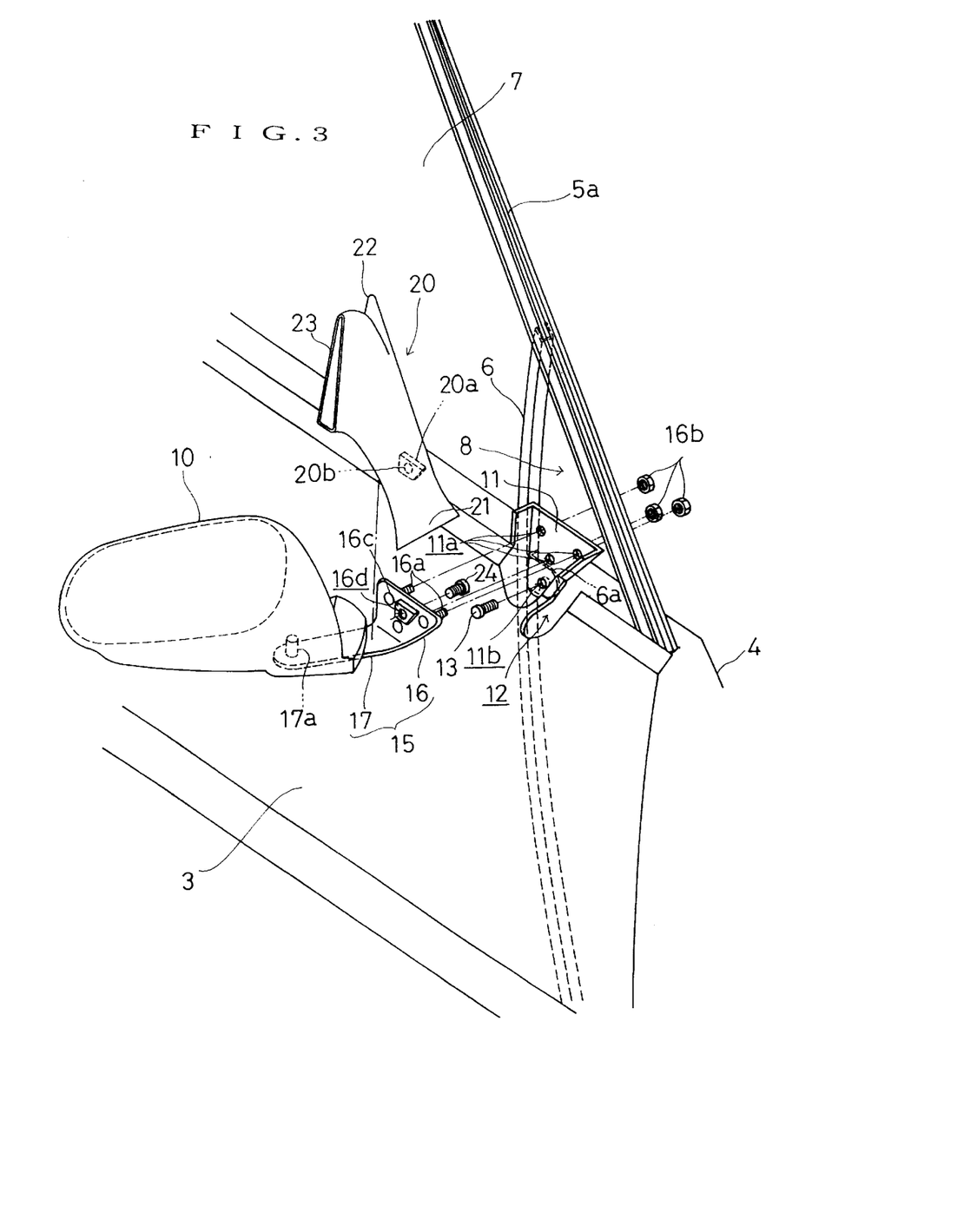
FIG. 3 is an exploded perspective view of a door mirror, a nozzle and the like of the front door.

As shown in FIG. 3, in the neighborhood of the triangular corner 8, a door mirror base 11 of a reversed triangular shape is provided extending up and down across the upper edge of the door body and making a dent in the outer panel 3. An upper edge portion of the outer panel 3 in front of and neighboring the door mirror base 11 is cut to form an opening 12 for the nozzle.

The door mirror base 11 has two upper attachment holes 11a, a middle attachment hole 11a and a lower attachment hole 11b. The guide sash 6 is inserted into the door body, between the outer panel 3 and the inner panel 4, through an opening formed at an upper edge of the door body and an upper part of the guide sash 6 projected from the opening constitutes a side of the triangular corner 8.

A bracket 6a projected forward from the guide sash 6 is brought into contact with an inner surface of the door mirror base 11 and fixed to the door mirror base 11 by a screw 13 inserted in the lower attachment hole 11b.

A support bracket 15 for supporting the door mirror 10 comprises a vertical attachment section 16, a horizontal support section 17 projected laterally from a lower end of the attachment section 16 and a support pivot 17a erected on an end portion of the horizontal support section 17. The door mirror 10 is supported on the pivot 17a for swinging motion.

The vertical attachment section 16 is shaped in a reversed triangle corresponding to the door mirror base 11 and has three screws 16a projected corresponding to the three attachment holes 11a of the door mirror base 11. A rectangular projection 16c having a central attachment hole 16d is formed at a center of the vertical attachment section 16.

The vertical attachment section 16 is brought into contact with an outside of the door mirror base 11 with the screws 16a inserted in the respective attachment holes 11a of the door mirror base 11 and nuts 16b are engaged with the screws 16a to attach the support bracket 15 to the door mirror base 11.

The nozzle 20 is disposed between the door mirror 10 and the vertical attachment section 16 of the support bracket as is pinched by them.

As shown in FIGS. 4 to 7, the nozzle 20 is shaped in a curved flat pipe extending obliquely from an upper stream side open end 21 at a lower front to an lower stream side open end 22 at an upper rear while increasing the sectional area gradually.

The upper stream side end portion of the nozzle 20 is expanded as a trumpet toward the open end 21. The lower stream side end portion of the nozzle 20 branches off into two branches. One of the branches extends straight and reaches a window side open end 22 opening rearward and another branch curves gradually toward a rectangular direction to reach a mirror side open end 23 opening laterally.

Figure 4:
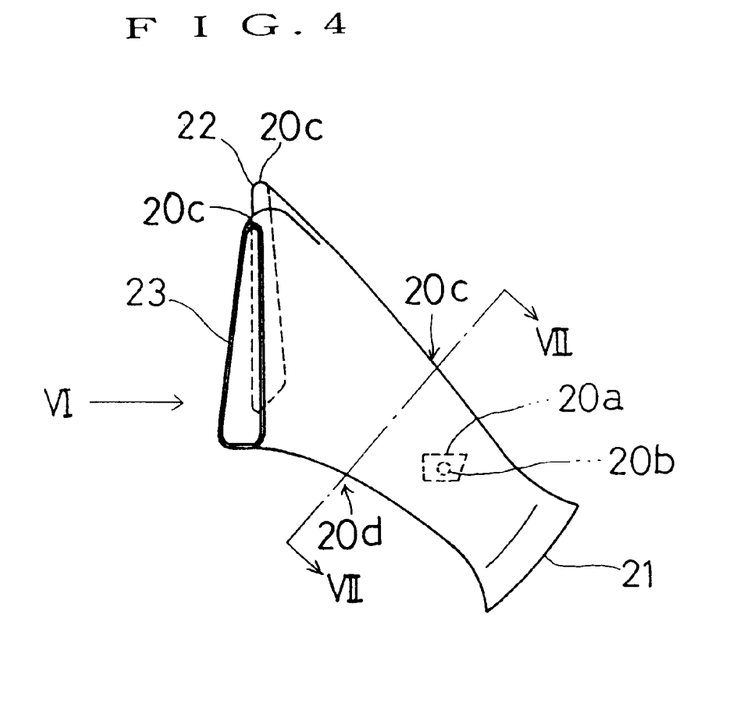
FIG. 4 is a side view of the nozzle.
Figure 5:
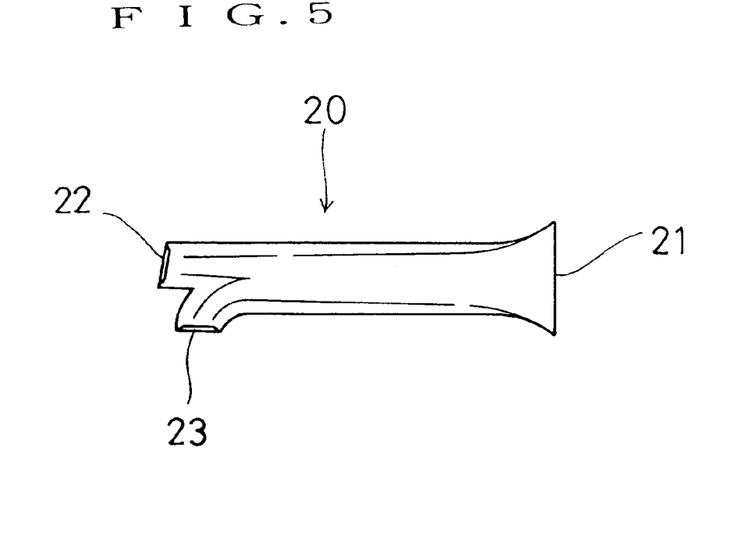
FIG. 5 is a plan view thereof.
Figure 6:
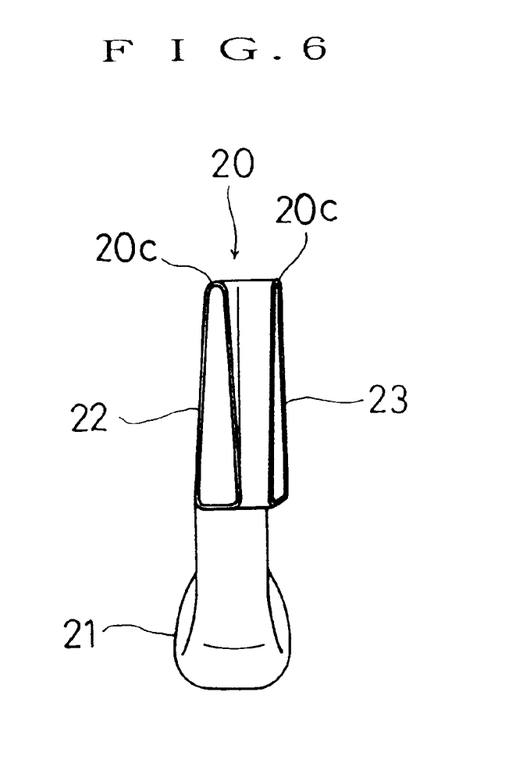
FIG. 6 is a rear view thereof.
Figure 7:
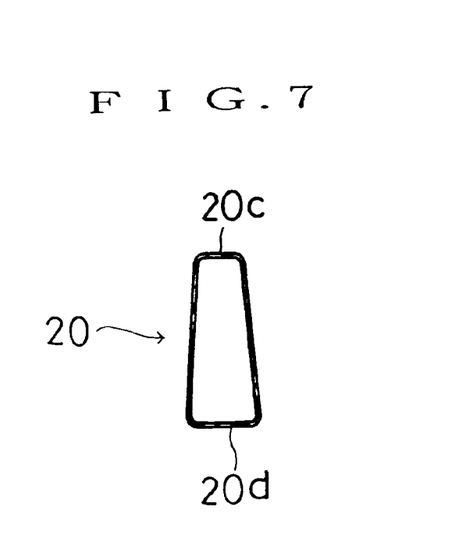
FIG. 7 is a section taken along the line VII—VII of FIG. 4.

As for the sectional shape of the nozzle 20, at a portion near the upper stream side open end 21, it is a prolonged circle, and at a middle portion, it is a trapezoid having an upper side 20c smaller than a lower side 20d as shown in FIG. 7. The upper side 20c corresponds to an outer side of the nozzle 20 with respect to the curve assumed by the nozzle 20 and the lower side 20d corresponds to an inner side with respect to the curve as shown in FIG. 4. At the window side open end 22 and the mirror side open end 23, the upper sides 20c are further smaller as shown in FIGS. 4 and 6.

Namely, the sectional shape of the nozzle 20 assuming a trapezoid prolonged upward and downward is gradually changed from the upper stream side to the lower stream side so that the upper side (outer side) becomes smaller. Therefore, an area of a flow passage at the outer side 20c becomes narrower as it goes to the lower stream side.

Air velocity at the outer side (centrifugal side) flow passage in the nozzle 20 is larger than that at the inner side (centripetal side) flow passage because of a positional relation between the nozzle 20 and a blower 30 to be mentioned later, and sectional area of the outer side flow passage is smaller than that of the inner side flow passage, so that the flow rate is distributed uniformly over all in any section of the nozzle 20.

The nozzle 20 has a rectangular dent 20a formed at a predetermined position on the outer surface facing the car-body and a threaded hole 20b is provided at the center of the dent 20a.

The nozzle 20 is disposed between the door mirror 10 and the vertical attachment section 16 of the support bracket 20 with the dent 20a fitted on the projection 16c of the vertical attachment section 16 for positioning, and a screw 24 is let pass through the attachment hole 16d and engaged with the threaded hole 20b for attaching the nozzle 20 to the support bracket 15.

After the support bracket 15, the nozzle 20 and the door mirror 10 are assembled into one unit as mentioned above, the support bracket 15 is attached to the door mirror base 11, so that the fitting work is simplified and man-hour for the work is reduced.

At that time, the upper stream side open end 21 of the nozzle 20 is inserted in the opening 12 formed at the upper edge of the outer panel 3. The upper stream side of the nozzle 20 and the opening 12 may be covered by a cover garnish.

Figure 8:
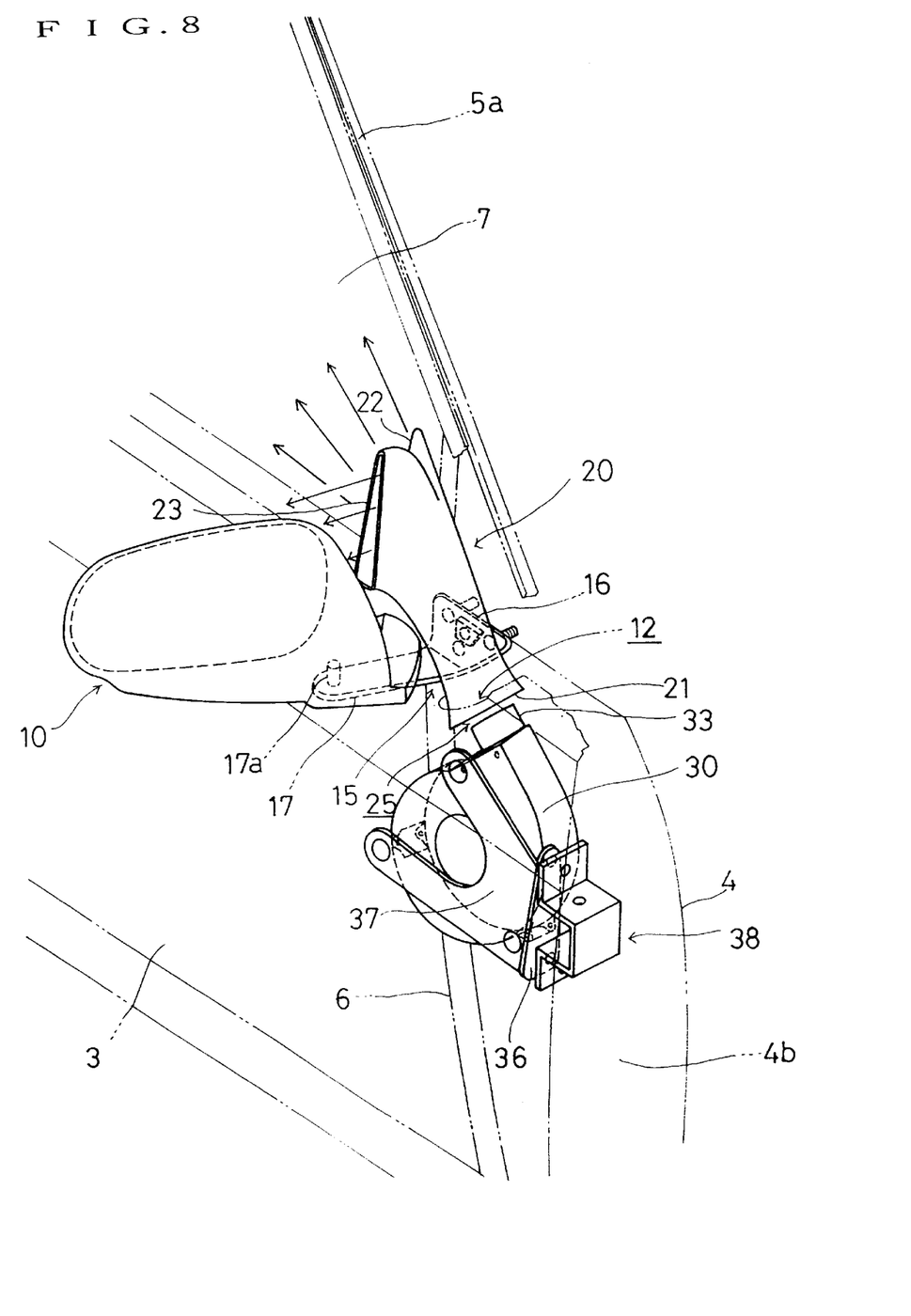
FIG. 8 is a perspective view showing an arrangement of the door mirror, the nozzle, the blower and the like to the door body of the front door.

Thus, the door mirror 10 and the nozzle 20 are attached to the door mirror base 11 at the triangular corner 8 on the front side of the front door 2 by the support bracket 15 as shown in FIG. 8.

Since the door mirror base 11 of a reversed triangular shape is provided extending up and down across the upper edge of the door body and making a dent in the outer panel 3, when the vertical attachment section 16 of the support bracket 15 is fixed to an upper half part of the door mirror base 11, the horizontal support section 17 of the support bracket 15 projects laterally at the same height as the upper edge of the outer panel 3. The nozzle 20 disposed between the door mirror 10 and the vertical attachment section 16 with the upper stream side open end 21 inserted in the opening 12 provided at the upper edge portion of the outer panel 3 in front of the door mirror base 11 can ensure a large flow passage section without swelling outside largely and can be arranged easily without interfering with the horizontal support section 17.

Figure 9:
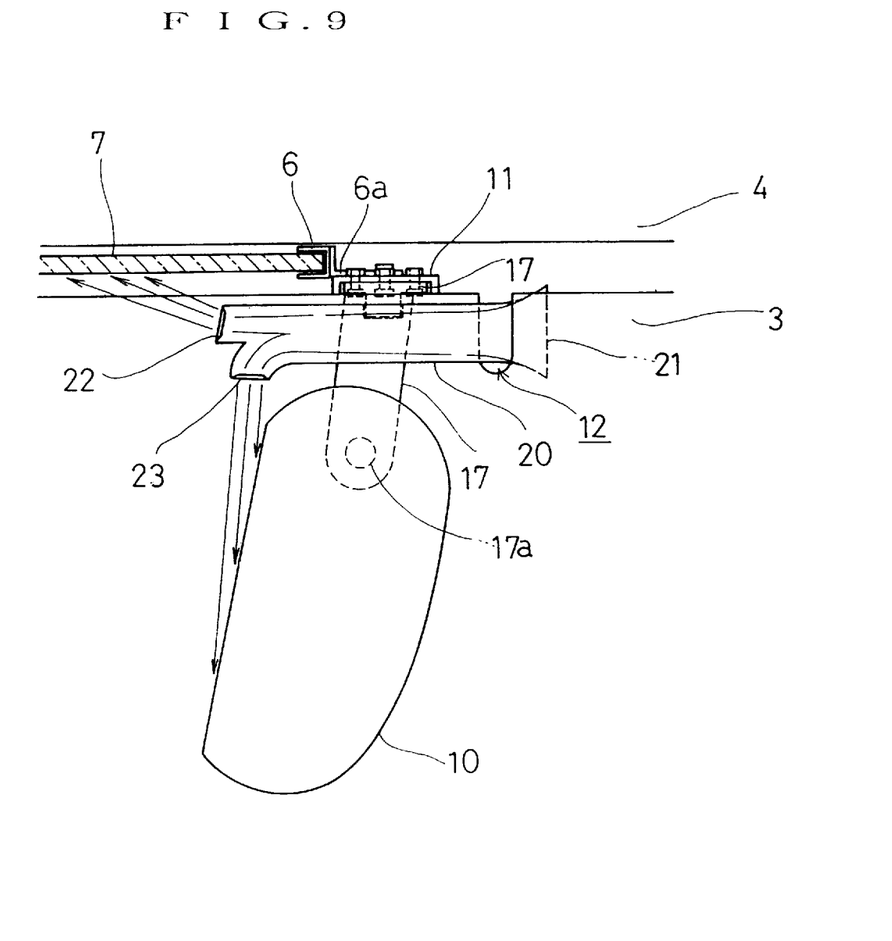
FIG. 9 is a plan view showing a positional relation of the door mirror and the side window to the nozzle.

As shown in FIG. 9, the window side open end 22 of the nozzle 20 is positioned near an outer surface of the side window 7 and opens directed obliquely to the surface, so that water wetting the side window 7 especially a portion thereof near the door mirror 10 can be blown away by air discharged from the window side opening. On the one hand, the opening of the mirror side open end 23 is directed obliquely to the mirror surface of the erected door mirror 10 so that water wetting the mirror surface of the door mirror 10 can be blown away by air discharged from the mirror side opening.

As shown in FIG. 8, the blower 30 for feeding air to the nozzle 20 is disposed within the door body in a posture that a discharge port 33 is opposite to the upper stream side open end 21 of the nozzle 20 leaving a space 25.

Figure 10:
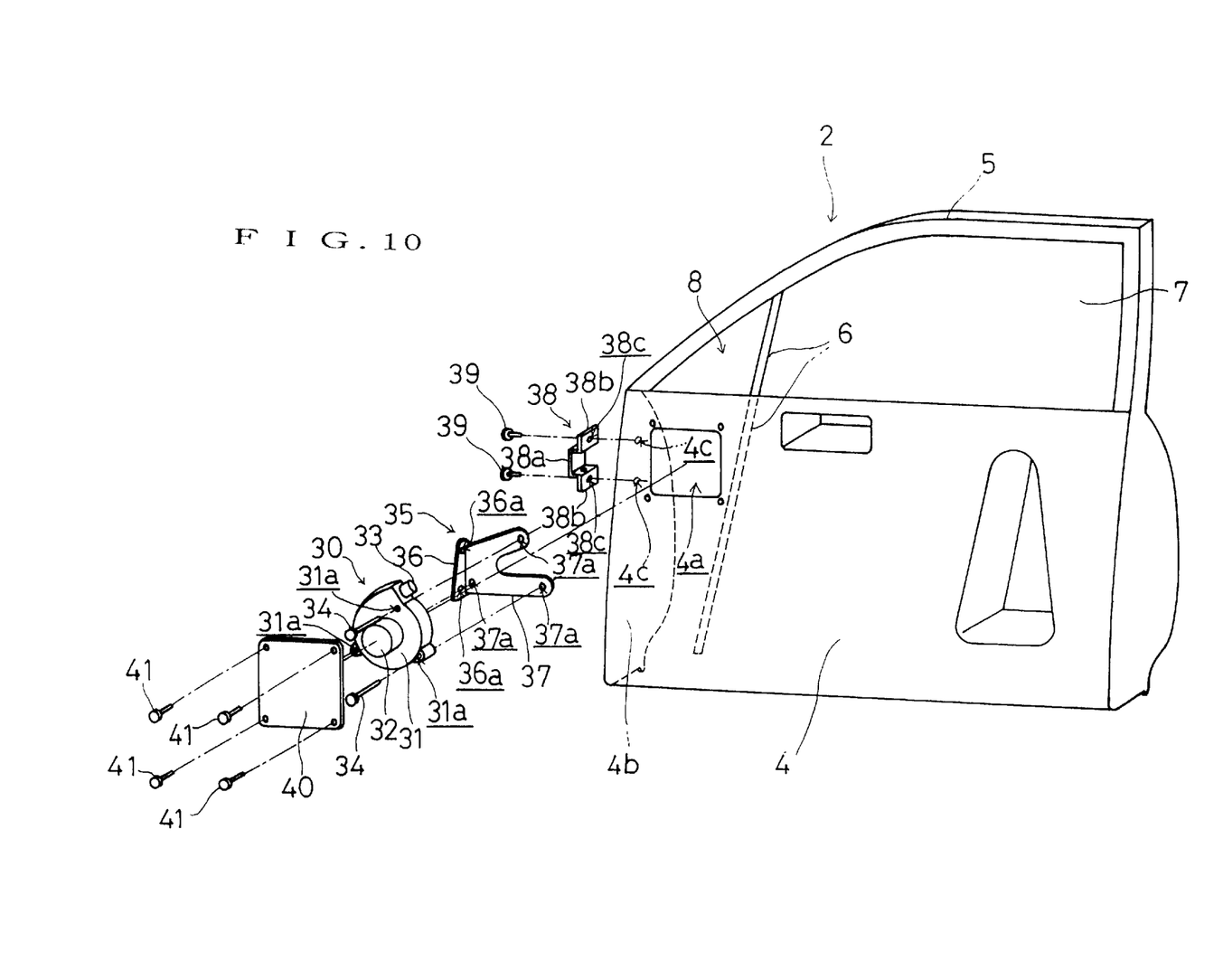
FIG. 10 is a exploded perspective view showing attachment of the blower to the front door.

FIG. 10 is an exploded perspective view of an attachment structure for the blower 30 viewed from inside of the front door 2.

The inner panel 4 has work openings for attachment of various instruments including a work opening 4a formed on an upper part in front of the guide sash 6. The shape of the work opening 4a is modified to utilize it for inserting and attaching the blower 30.

Since there is no need to provide an additional exclusive opening for attaching the blower, rigidity of the inner panel 4 is not lowered and cost-up can be avoided. Change the shape of the opening 4a to some extent hardly influences the rigidity of the inner panel. Further, from the viewpoint of positional relation to the door mirror 10, the upper part of the body in front of the guide sash 6 is an optimum position for disposing the blower.

The blower 30 is attached by a attachment bracket 35 which is composed of a an attachment plate section 36 in front and a bifurcate support plate section 37 fixed to the attachment plate section 36 and extending therefrom at right angles rearward. The attachment plate section 36 has upper and lower attachment holes 36a and the support plate section 37 has three attachment holes 37a at predetermined positions.

The door body has a front end wall 4b formed by bending a front part of the inner panel 4 outside and upper and lower door hinges 38 is attached to the front end wall 4b (only the upper door hinge 38 is shown in FIG. 10). The door hinge 38 is formed by bending a long rectangular plate member and has a U-shaped pivot portion 38a and flanges 38b formed on upper and lower sides of the pivot portion 38a. The flanges 38b are fixed onto the front end wall 4b of the door body.

The upper and lower flanges 38b has respective attachment holes 38c corresponding to attachment holes 4c formed at specific positions of the front end wall 4b of the door body. The attachment holes 36a of the attachment plate section 36 of the attachment bracket 35 also correspond to the attachment holes 38c and 4b, and the upper door hinge 38 and the attachment bracket 35 are fixed to the front end wall 4b together by bolts 39 passing through the attachment holes 38c, 4c and 36a.

The blower 30 is a centrifugal blower having a fan, a disk-like blower cover 31 covering the fan, a motor 32 for driving the fan projecting from a central part of the blower case 31, a suction port opening at a central part of the opposite side of the blower case 31, and a discharge port 33 provided on a periphery of the blower case 31 so as to discharge air tangentially.

The disk-like blower case 31 has three attachment holes 31a corresponding to the three attachment holes 37a of the support plate section 37 of the attachment bracket 35. The blower 30 is brought into contact with the support plate section 37 of the attachment bracket 35 from the inside and fixed to the attachment bracket 35 by bolts 34 passing through the attachment holes 31a, 37a aligned with each other.

Namely, the attachment bracket 35 is inserted in the door body through the opening 4a of the inner panel 4 somewhat transformed so that the blower 30 can be inserted and attached to the front end wall 4 of the door body together with the door hinge 38 beforehand, then the blower 30 is inserted through the opening 4a and fixed to the support plate section 37 of the attachment bracket as mentioned above.

After that, the opening 4a is closed by a rectangular cover 40 of steel plate fixed to the inner panel 4 by screws 41. Since the attachment bracket 35 for the blower 30 is fixed to the front end wall 4b of the door body together with the door hinge 38 having high rigidity, the blower 30 can be attached firmly requiring no additional reinforcement member, and vibration or noise due to operation of the blower 30 can be reduced.

Further, the cover 40 closing the opening 4a intercepts noise of the blower 30. The opening 4a is an ordinary work opening somewhat changed in shape and there is no need to provide an additional opening for the blower 30, therefore rigidity of the inner panel 4 can be maintained, moreover the cover 40 fixed to the inner panel 4 around the opening 4a improves rigidity of the inner panel 4.

Figure 11:
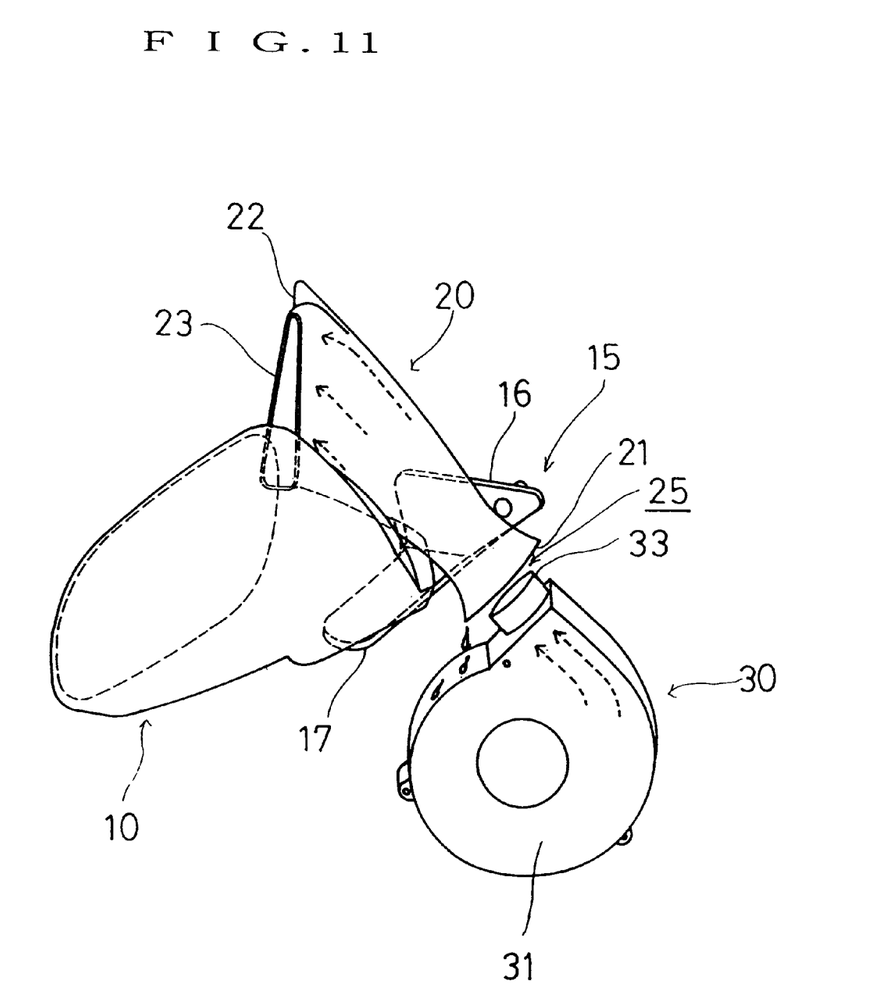
FIG. 11 is a perspective view showing a positional relation of the door mirror, the nozzle and the blower.

The blower 30 attached within the door body in such a manner as mentioned above is positioned at an optimum upper position in front of the guide sash 6. As shown in FIG. 11, the discharge port 33 is positioned at an upper portion of the disk-like blower case 31 directed to the upper stream side open end 21 of the nozzle 20 inserted in the opening 12 on the upper edge of the outer panel 3 and opposite to the opening of the open end 21 leaving a little space 25.

Since the upper stream side end portion of the nozzle 20 is expanded as a trumpet toward the open end 21, air discharged from the discharge port 33 is blown into the nozzle 20 wholly in spite of the space 25.

The nozzle 20 extends from the lower stream side end thereof in rear to the upper stream side open end 21 in front downward obliquely and the upper stream side open end 21 expanded as a trumpet opens obliquely downward being opposite to the discharge port 33 of the blower 30 leaving the space 25, therefore water entering into the nozzle 20 through the window side open end 22 and the mirror side open end 23 flows along a bottom surface of the nozzle 20 inclined downward and, as shown in FIG. 11, drops down from a lower edge portion of the opening of the trumpet-like upper stream side open end 21 onto a place within the door body apart from the discharge port 33 of the blower 30 so that the water does not intrude into the blower 30.

A connecting pipe to connect the upper stream side open end 21 of the nozzle 20 with the discharge port 33 of the blower 30 is unnecessary so that a number of attachment parts can be reduced. The nozzle 20 and the blower 30 are attached separately so that way of the attachment is not limited and the attachment can be carried out in an arbitrary sequence. Therefore the attachment work is simple.

Within the disk-like blower case 31 of the blower 30 which is a centrifugal blower, air velocity at the radially outer side is larger than that at the radially inner side. Therefore, as for the air blown into the upper stream side open end 21 of the nozzle 20 from the discharge port 33 too, velocity at the aforementioned outer side of the nozzle corresponding to the radially outer side of the blower is larger than that at the aforementioned inner side, as shown in FIG. 11 by dotted line arrows.

As mentioned before, the sectional shape of the nozzle 20 assuming a trapezoidal prolonged up and down is gradually changed so that an area of a flow passage at the outer side becomes narrower as it goes to the lower stream side. Thus, in the nozzle 20, sectional area of the outer side flow passage where air velocity is higher is smaller and sectional area of the inner side flow passage where air velocity is lower is larger so that the flow rate is distributed uniformly over all in any section of the nozzle 20.

Therefore, flow rate of air blown off from each of the window side open end 22 and the mirror side open end 23 which are prolonged up and down is also distributed uniformly, and waterdrops wetting a specific part of outer surface of the side window 7 or the mirror surface of the door mirror 10 can be blown away evenly by the air of uniformly distributed flow rate.

What is claimed is:

1. A waterdrop removing apparatus for a vehicle having a nozzle for guiding air discharged from a blower disposed in a door body at least to a door mirror to blow away waterdrops wetting a surface of the door mirror, wherein an attachment bracket for attaching said blower in the door body is fixed to a door hinge or in close proximity to the door hinge, and wherein the door hinge and said attachment bracket are clamped by a bolt together with a front end wall of the door body interposed between the door hinge and said attachment bracket.

* * * * *